United States Patent
Lim (10) Patent No.: US 8,474,141 B2
(45) Date of Patent: Jul. 2, 2013

(54) METHOD OF MODIFYING A SURFACE OF A NOZZLE OF A LIQUID DISPENSER USED FOR MANUFACTURING A LIQUID CRYSTAL DISPLAY

(75) Inventor: Yong Woon Lim, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 329 days.

(21) Appl. No.: 12/971,811

(22) Filed: Dec. 17, 2010

(65) Prior Publication Data

US 2012/0036694 A1     Feb. 16, 2012

(30) Foreign Application Priority Data

Aug. 11, 2010 (KR) .......................... 10-2010-0077478

(51) Int. Cl.
     *B21D 51/16*      (2006.01)
(52) U.S. Cl.
     USPC .................................. 29/890.142; 29/890.09
(58) Field of Classification Search
     USPC ............. 29/890.142, 890.12, 402.18, 402.04, 29/890.09; 222/146.5; 349/92, 189
See application file for complete search history.

(56) References Cited

U.S. PATENT DOCUMENTS 5,680,189 A * 10/1997 Shimizu et al. ............... 349/123
6,874,662 B2     4/2005 Kim et al.

FOREIGN PATENT DOCUMENTS

| JP | 2005-261996 | 9/2005 |
| JP | 2008-178852 | 8/2008 |
| KR | 1020030076777 | 9/2003 |
| KR | 1020030095716 | 12/2003 |
| KR | 1020090028189 | 3/2009 |

* cited by examiner

*Primary Examiner* — Alexander P Taousakis
(74) *Attorney, Agent, or Firm* — F. Chau & Associates, LLC (57) ABSTRACT

A method of modifying a surface of the nozzle of a liquid dispenser used to dispense liquid for manufacturing a liquid crystal display (LCD) includes primarily modifying the surface of the nozzle by performing one of oxygen ($O_2$) or ozone ($O_3$) plasma treatment with respect to the surface of the nozzle, secondarily modifying the primarily modified surface of the nozzle by treating the primarily modified surface with aminopropyltriethoxysilane, and tertiary modifying the secondarily modified surface of the nozzle by allowing an epoxy resin to react with the secondarily modified surface of the nozzle.

19 Claims, 9 Drawing Sheets

METHOD OF MODIFYING A SURFACE OF A NOZZLE OF A LIQUID DISPENSER USED FOR MANUFACTURING A LIQUID CRYSTAL DISPLAY

CROSS-REFERENCE TO RELATED APPLICATION

This application claims priority to Korean Patent Application No. 10-2010-0077478 filed on Aug. 11, 2010, the disclosure of which is hereby incorporated by reference herein in its entirety.

BACKGROUND OF THE INVENTION

1. Technical Field

The present disclosure relates to a method of modifying a surface of a nozzle of a liquid dispenser. More particularly, the present disclosure relates to a method of modifying a surface of a nozzle of a liquid dispenser used for manufacturing a liquid crystal display.

2. Description of the Related Art

A liquid crystal display includes two substrates and a liquid crystal layer interposed between the two substrates, and displays an image by using an anisotropic refractive index.

To manufacture the liquid crystal display, the two substrates are fabricated separately, and then the two substrates are combined with each other. Liquid crystal injection between the two substrates follows to form a liquid crystal panel after combining the two substrates. The injection of the liquid crystal may be performed by using the difference between internal and external pressures of the liquid crystal panel.

However, in the process of injecting the liquid crystal between the two substrates, since the space between the two substrates may be narrowed, it may take a long time to move the liquid crystal to the space. Accordingly, the process of injecting the liquid crystal may difficult to apply to a liquid crystal panel having a large area.

SUMMARY OF THE INVENTION

The present invention provides a method of modifying a surface of a nozzle used for a liquid dispenser.

The present invention also provides a method of forming a liquid crystal layer by using the liquid dispenser equipped with the nozzle modified through the method of modifying the surface of the nozzle.

In one aspect of the present invention, a method of modifying a surface of a nozzle of a liquid dispenser used to dispense liquid for manufacturing a liquid crystal display (LCD) is provided. The method includes primarily modifying the surface of the nozzle by performing one of oxygen ($O_2$) or ozone ($O_3$) plasma treatment with respect to the surface of the nozzle, secondarily modifying the primarily modified surface of the nozzle by treating the primarily modified surface with aminopropyltriethoxysilane, and tertiary modifying the secondarily modified surface of the nozzle by allowing an epoxy resin to react with the secondarily modified surface of the nozzle.

The tertiary modifying of the secondarily modified surface of the nozzle may be performed by dipping the secondarily modified surface of the nozzle into the epoxy resin or by dropping the epoxy resin on the secondarily modified surface of the nozzle.

The tertiary modified surface of the nozzle may have an epoxy resin layer having a thickness of about 10 nm The epoxy resin may have epoxy terminated polydimethylsiloxane as epoxy terminated silicone.

The nozzle may include SUS (steel use stainless), tungsten compounds, or aluminum.

Liquid crystal, a sealant, or alignment solution used for a liquid crystal display may be dropped by using the liquid dispenser.

In another aspect of the present invention, a liquid crystal layer is formed by using the nozzle having the surface modified through method. A method of forming the liquid crystal layer includes preparing a nozzle to drop liquid, modifying a surface of the nozzle through the method including the primarily, secondarily and tertiary modifying steps already described herein, mounting the nozzle having the modified surface on a liquid dispenser, preparing liquid crystal, preparing a substrate for a liquid crystal display, and exhausting the liquid crystal on the substrate through the nozzle with the modified surface mounted on the liquid dispenser.

As described above, according to the present invention, the surface of the nozzle of the liquid dispenser is modified, thereby preventing liquid from being aggregated when the liquid is dropped.

According to the present invention, the liquid crystal layer is formed by using the method of modifying the surface of the nozzle, so that the liquid crystal display can be manufactured with a reduced defective rate. In accordance with another aspect of the present invention, a method for manufacturing a Liquid Crystal Display (LCD) is provided. The method includes modifying a surface of a nozzle of a liquid dispenser by primarily modifying the surface of the nozzle by performing one of oxygen ($O_2$) or ozone ($O_3$) plasma treatment with respect to the surface of the nozzle, secondarily modifying the primarily modified surface of the nozzle by treating the primarily modified surface with aminopropyltriethoxysilane, and tertiary modifying the secondarily modified surface of the nozzle by allowing an epoxy resin to react with the secondarily modified surface of the nozzle. The method further includes installing the nozzle with the surface modified by the primarily, secondarily and tertiary modifying steps on a liquid dispenser to dispense a liquid including at least one liquid crystal, a sealant and alignment solution, forming gate lines, data lines, thin film transistors and pixel electrodes on a first substrate and wherein each of the thin film transistors is connected to a corresponding one of the gate lines and data lines and the pixel electrodes are connected to the thin film transistors. The method further includes forming a first alignment layer on the first substrate having the thin film transistors thereon and rubbing the first alignment layer, dispensing liquid crystal on the alignment layer, forming color filters and a common electrode on a second substrate, forming a second alignment layer on the second substrate having the color filters and the common electrode thereon and rubbing the second alignment layer. In addition, the method further includes applying a sealant to an outer portion of at least one of the first and second substrates, combining the first and second substrates to each other by applying a pressure to the first and second substrates to thereby form a liquid crystal layer between the combined first and second substrates, processing the combined first and second substrates by cutting the combined first and second substrates and checking to determine whether there are any defects in the processed first and second substrates.

BRIEF DESCRIPTION OF THE DRAWINGS

Exemplary embodiments of the present invention can be understood in more detail from the following detailed description when considered in conjunction with the accompanying drawings wherein.

DESCRIPTION OF THE EXEMPLARY EMBODIMENTS

Hereinafter, exemplary embodiments of the present invention will be described in detail with reference to accompanying drawings. However, the present invention is not limited to the following embodiments but may include various changes, substitutions and modifications within the technical scope of the present invention.

In the drawings, the sizes of layers and regions can be magnified for the purpose of clear explanation. The terms "first", "second" and the like can be used to explain various elements but the elements are not limited to such terms. The terms are used to distinguish one element to the other element. Thus, an element referred to as a first element in one embodiment can be referred to as a second element in another embodiment. Unless the context otherwise requires, the singular expression may not exclude the plural expression.

In the following description, the terms "include" or "comprises" are used to indicate the feature, number, step, operation, elements, parts or combination thereof without excluding other feature, number, step, operation, elements, parts or combination thereof. It will be understood that when an element, such as a layer, a film, a region, or a plate, is referred to as being 'on' or 'under' another element, the element can be directly on another element or intervening element may also be present therebetween. In addition, when an element is referred to as being "directly on" other element, intervening layers may not be present therebetween.

The present invention relates to a method of modifying a surface of a nozzle of a liquid dispenser used to exhaust liquid in a liquid dispenser for manufacturing an LCD (liquid crystal display). Hereinafter, since the liquid dispenser is used to manufacture the LCD, the LCD and a method of manufacturing the LCD will be first described, and the method of modifying the surface of the nozzle of the liquid dispenser will be second described.

Figure 1:
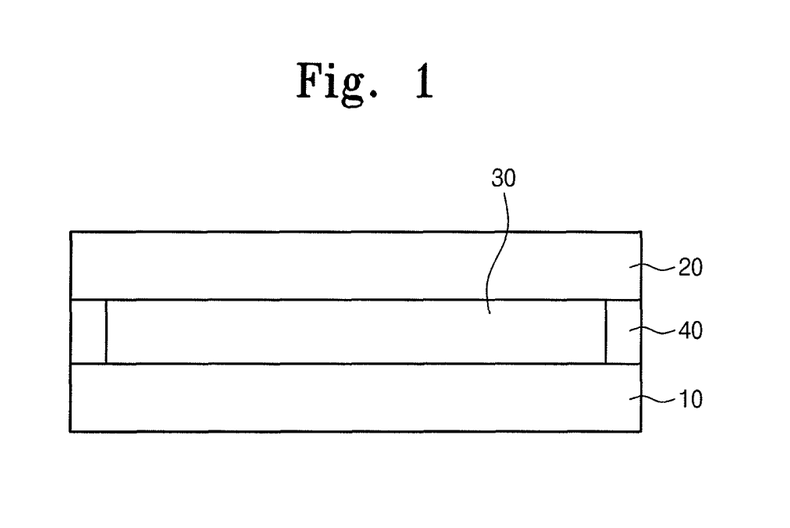
FIG. 1 is a sectional view showing a liquid crystal display.

FIG. 1 is a sectional view schematically showing the LCD.

Referring to FIG. 1, the LCD includes a first substrate 10, a second substrate 20, a liquid crystal layer 30, and a sealant 40.

The first substrate 10 includes pixels provided at a plurality of pixel regions and an alignment layer. Each pixel includes a thin film transistor and a pixel electrode connected to the thin film transistor. The alignment layer is formed on the pixels to align liquid crystal molecules of the liquid crystal layer 30 to be formed in the following process.

The second substrate 20 faces the first substrate 10. The second substrate 20 includes a plurality of color filters to realize colors, a common electrode to form an electric field together with the pixel electrodes, and an alignment layer. The alignment layer is formed on the common electrode.

The liquid crystal layer 30 is interposed between the first and second substrates 10 and 20. The liquid crystal layer 30 includes liquid crystal molecules, and the liquid crystal molecules are controlled by the electric field.

The sealant 40 is interposed between the first and second substrates 10 and 20 along the edges of the first and second substrates 10 and 20. The sealant 40 seals the liquid crystal layer 30.

In the LCD having the above structure, the liquid crystal molecules are driven by the electric field. Accordingly, the transmittance of light transmitting the liquid crystal layer 30 may be controlled, thereby resulting in displaying an image.

Although the present invention has been described in that the structure of the LCD includes thin film transistors on the first substrate 10 and color filters on the second substrate 20 as an example, the present invention is not limited thereto. For example, the color filters and the thin film transistors may be formed on the same substrate.

Figure 2:
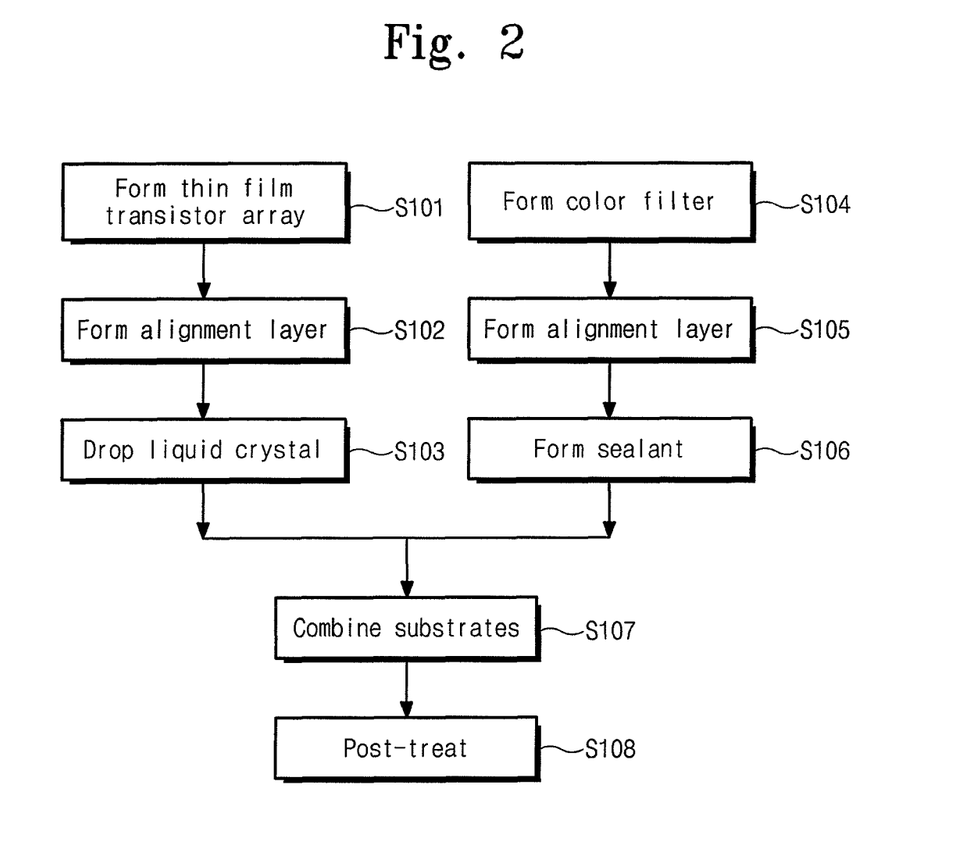
FIG. 2 is a flowchart showing the manufacturing process of the liquid crystal display

FIG. 2 is a flowchart schematically showing the manufacturing process of the LCD of FIG. 1.

Referring to FIGS. 1 and 2, the manufacturing process of the LCD according to one embodiment of the present invention includes a first substrate process, a second substrate process, a combining process S107, and a post-treatment process S108.

The first substrate process includes a thin film transistor array forming step S101, an alignment layer forming step S102, and a liquid crystal dropping step S103.

In the thin film transistor array forming step S101, wires, thin film transistors, and pixel electrodes are formed on a first substrate 10. The wires include a plurality of gate lines and a plurality of data lines. Each thin film transistor is connected to a corresponding gate line among the gate lines and a corresponding data line among the data lines. The pixel electrodes are connected to the thin film transistors.

In the alignment layer forming step S102, an alignment layer is coated on the first substrate 10 provided thereon with the thin film transistor array, and the alignment layer is rubbed.

In the liquid crystal dropping step S103, liquid crystal is dropped on the alignment layer by using a liquid crystal dispenser.

The second substrate process includes a color filter forming step S104, an alignment layer forming step S105, and a sealant forming step S106.

In the color filter forming step S104, red, green, and blue color filters are formed on a second substrate 20, and the common electrode is formed on the second substrate 20 having the color filters.

In the alignment layer forming step S105, an alignment layer is coated on the second substrate 20 having the color filters and the common electrode, and the alignment layer is rubbed.

In the sealant applying step S106, the sealant 40 is applied to an outer portion of at least one of the first and second substrates 10 and 20.

In the combining process S107, a pressure is applied to the first and second substrates 10 and 20, so that the first and second substrates 10 and 20 are combined to each other. Thus, the liquid crystal layer 30 is formed between the first and second substrates 10 and 20. The first and second substrates 10 and 20 are bonded to each other by the sealant 40.

The post-treatment process S108 includes steps of processing and checking the combined substrates. In the step of processing the combined substrates, the combined substrates are cut. In the step of cutting the combined substrates, when a plurality of panel regions are formed on a glass substrate having a large area, the glass substrate may be cut corresponding to the panel regions. In the step of checking the combined substrates, the processed substrates are checked to determine whether there are any possible defects.

Through the above processes, the LCD is formed. Although the embodiment of the present invention has been described in that liquid crystal is dropped on the first substrate 10, and the sealant 40 is applied on the second substrate 20, the present invention is not limited thereto. For example, the sealant 40 may be applied on the first substrate 10, and the liquid crystal may be dropped on the second substrate 20. According to another embodiment, the sealant 40 may be applied on the first substrate 10, and the liquid crystal may be dropped on the first substrate 10.

To manufacture the LCD, a process of dropping or exhausting liquid having viscosity through a nozzle is used. For example, the LCD can be manufactured by dropping the liquid crystal as well as an alignment solution or a sealant.

The present invention provides a method of modifying the surface of a nozzle used for a liquid dispenser to exhaust the liquid without aggregation. Even if the following description will be made regarding a liquid crystal dropping nozzle as an example, the present invention is not limited thereto. The present invention is applicable to a nozzle to drop materials, such as, for example, an alignment solution and a sealant, having both of a liquid phase and viscosity. Therefore, according to another embodiment, the liquid crystal dropping nozzle used in the liquid crystal dispenser may be interpreted as an alignment solution dropping nozzle used in an alignment solution dispenser. According to still another embodiment, the liquid crystal dropping nozzle may be interpreted as a sealant dropping nozzle used in a sealant dispenser.

In the present specification, when liquid is placed onto another target material, all of the dropping, exhausting, and spraying of the liquid using a nozzle have to be understood as the same meaning in that the liquid is supplied in the form of a droplet to the target material by using the nozzle.

Figure 3:
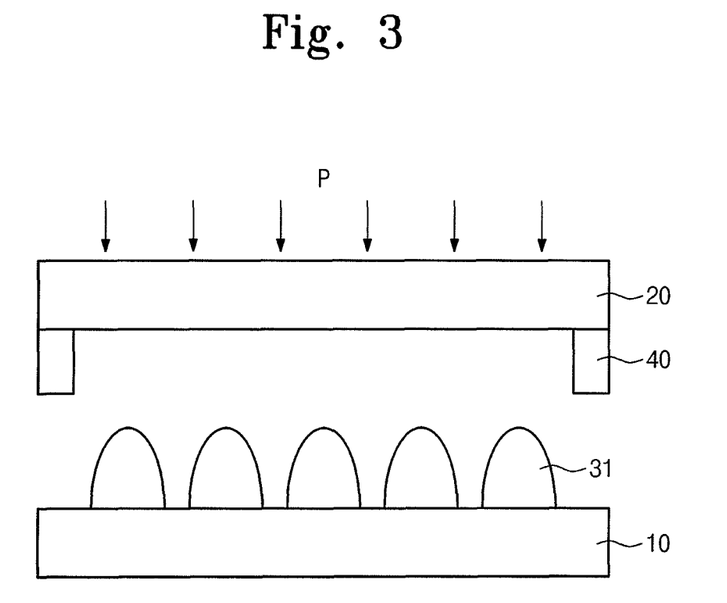
FIG. 3 is a sectional view schematically showing a step of combining two substrates with each other when a liquid crystal dropping scheme is used according to an exemplary embodiment of the present invention.

FIG. 3 is a view showing the combining process S107 of FIG. 2.

Referring to FIG. 3, before the first and second substrates 10 and 20 are combined with each other, liquid crystal 31 is dropped in the form of a droplet on the first substrate 10. According to another embodiment of the present invention, as described above, the liquid crystal 31 may be dropped on the second substrate 20 instead of the first substrate 10. The liquid crystal 31 is preferably dropped on a lower substrate such that the liquid crystal 31 is stably placed on the lower substrate.

The sealant 40 is applied to an outer portion of the second substrate 20.

Then, as a pressure P is applied to the first and second substrates 10 and 20, the first substrate 10 may be combined with the second substrate 20. Simultaneously, the liquid crystal 31 may be spread by the pressure P, so that the liquid crystal layer 30 may be formed between the first and second substrates 10 and 20 at a uniform thickness.

Figure 4:
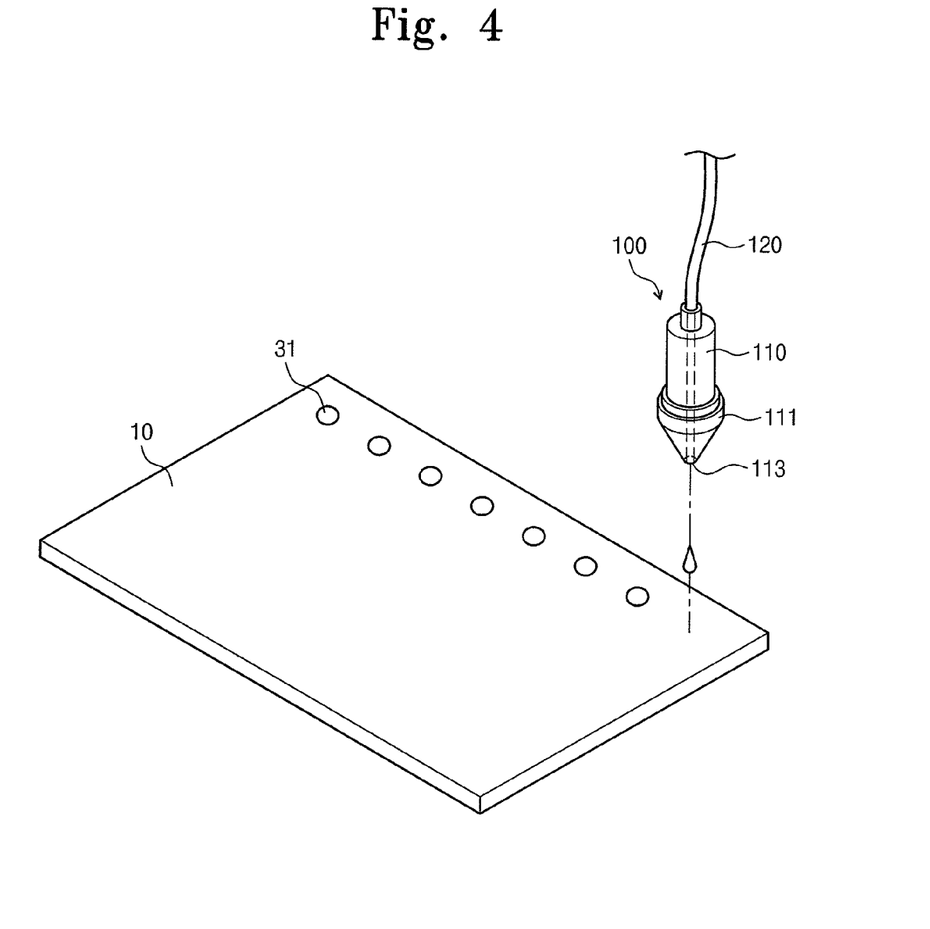
FIG. 4 is a view showing the concept of dropping liquid crystal on a substrate by using a liquid crystal dispenser according to an exemplary embodiment of the present invention.

FIG. 4 is a view showing a case in which the liquid crystal 31 is dropped on the first substrate 10 by using a liquid crystal dispenser 100.

Referring to FIG. 4, the liquid crystal dispenser 100 according to one embodiment of the present invention is installed above the first substrate 10. The liquid crystal dispenser 100 includes a connection tube 120 to supply the liquid crystal 31 and an inkjet head 110 connected to the connection tube 120 to drop the liquid crystal 31. A plurality of inkjet heads 110 may be provided. The inkjet heads 110 may be spaced apart from each other.

The inkjet head 110 is provided with a liquid crystal dropping nozzle 111. An outlet 113 is provided at an end of the liquid crystal dropping nozzle 111 to exhaust the liquid crystal 31. After the liquid crystal 31 has been supplied to the connection tube 120, the liquid crystal 31 is supplied to the first substrate 10 through the outlet 113 of the liquid crystal dropping nozzle 111. The liquid crystal dropping nozzle 111 is provided in opposite to the first substrate 10. As the liquid crystal dropping nozzle 111 is open or closed, an amount of the liquid crystal 31 to be dropped on the first substrate 10 may be adjusted.

The liquid crystal 31 may be dropped from the liquid crystal dropping nozzle 111 to the first substrate 10 while moving the inkjet head 110 or the first substrate 10. In addition, the liquid crystal 31 may be dropped from the liquid crystal dropping nozzle 111 to the first substrate 10 while simultaneously moving both of the inkjet head 110 and the first substrate 10.

The liquid crystal dropping nozzle 111 includes metal which is subject to less scratches by abrasion. The metal may include, for example, SUS (steel use stainless), tungsten compounds, or aluminum. The tungsten compounds may include, for example, tungsten carbide.

The outlet 113 may have various bores for adjusting an amount of dropped liquid crystal 31. The outlet 113 may have the bore in the range of about 100 μm to about 400 μm. For example, the outlet 113 may have the bore of about 150 μm or about 300 μm.

Figure 5:
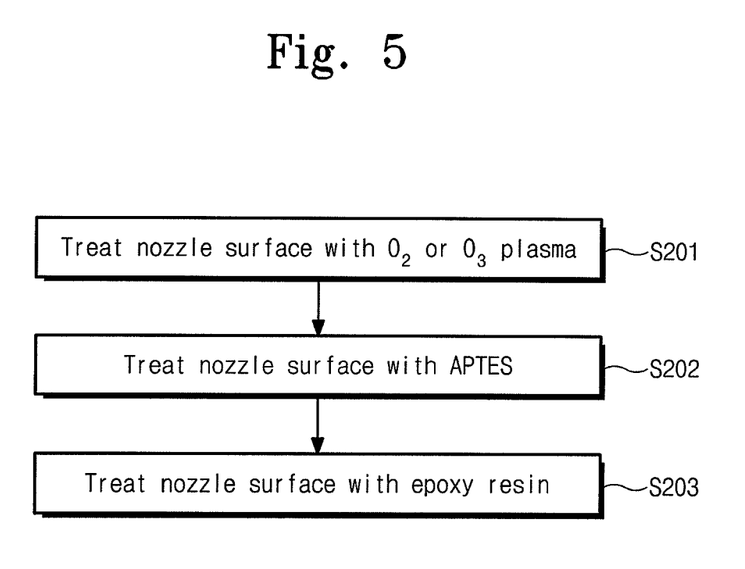
FIG. 5 is a flowchart showing a method of processing the surface of a nozzle according to an exemplary embodiment of the present invention.
Figure 6:
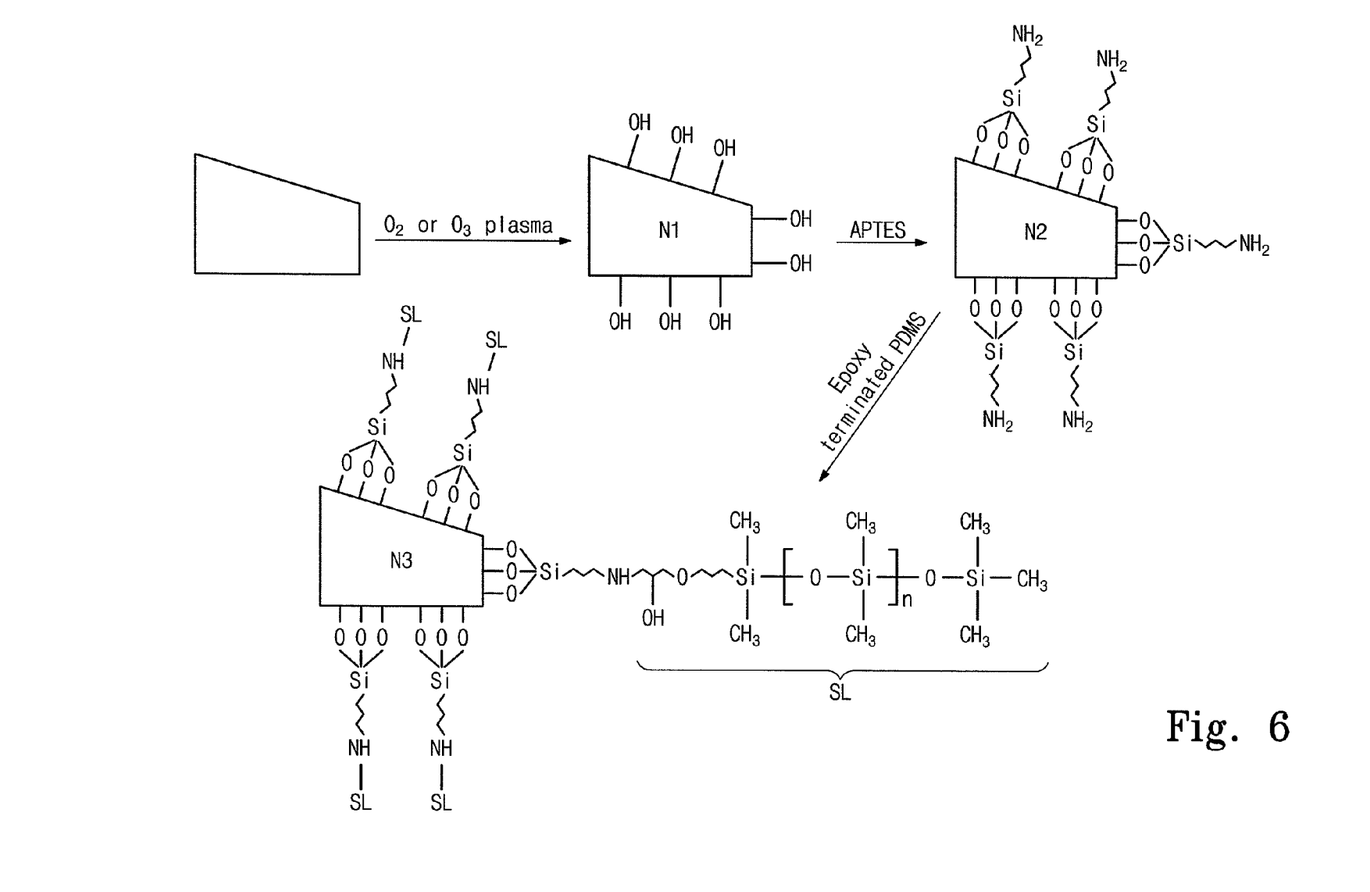
FIG. 6 is a sectional view showing the surface state of the nozzle in the method of processing the surface of the nozzle according to an exemplary embodiment of the present invention.

FIG. 5 is a flowchart showing a method of surface-processing the liquid crystal dropping nozzle 111, and FIG. 6 is a sectional view showing the surface state of the liquid crystal dropping nozzle 111 according to the method of surface-processing the liquid crystal dropping nozzle 111. For the purpose of explanation, only a portion of the liquid crystal dropping nozzle 111 is shown in FIG. 6.

Hereinafter, a method of modifying the surface of the liquid crystal dropping nozzle 111 of the liquid crystal dispenser 100 will be described with reference to FIGS. 5 and 6.

The method of modifying the surface of the liquid crystal dropping nozzle 111 includes a first modification step S201, a second modification step S202, and a third modification step S203 performed with respect to the surface of the liquid crystal dropping nozzle 111.

According to the first modification step S201, the liquid crystal dropping nozzle 111 is loaded into a reaction chamber, and the surface of the liquid crystal dropping nozzle 111 may be subject to, for example, oxygen ($O_2$) or ozone ($O_3$) plasma treatment such that the surface of the liquid crystal dropping nozzle 111 may be modified. Through the plasma treatment, the surface of the liquid crystal dropping nozzle 111 may obtain a hydroxyl (—OH) group. As the hydroxyl (—OH) group may have reactivity comparatively higher than other functional groups, the hydroxyl (—OH) group may facilitate the reaction between itself and the polymer in the following process. In this case, the plasma treatment may be performed by injecting $O_2$ or $O_3$ for about 30 seconds to one minute by using a plasma injector while maintaining the internal pressure of the reaction chamber under about 50 mTorr to about 100 mTorr. After the first modification step S201, the surface of the liquid crystal dropping nozzle 111 may obtain hydroxyl (—OH) groups as shown in reference sign N1.

According to the second modification step S202, the surface of the liquid crystal dropping nozzle 111, which has been subject to the first modification step S201, is treated with APTES (aminopropyltriethoxysilane).

Through the second modification step S202, the hydroxyl (—OH) group of the liquid crystal dropping nozzle 111 may react with the triethoxysilyl group of the APTES. The APTES may be supplied in the form of a liquid phase. The APTES may be coated on the primarily modified surface of the liquid crystal dropping nozzle 111 under a normal temperature or may be dropped on the primarily modified surface of the liquid crystal dropping nozzle 111. The liquid crystal dropping nozzle 111, which has been subject to the first modification step S201, may be dipped into the APTES, so that the APTES may be placed on the surface of the liquid crystal dropping nozzle 111. Accordingly, the triethoxysilyl group of the APTES may react with the hydroxyl (—OH) group. Therefore, after the second modification step S202 has been performed, an aminopropylsilyl group may be attached to the liquid crystal dropping nozzle 111 as shown through reference sign N2. The second modification step S202 is performed to introduce an amine group onto the surface of the liquid crystal dropping nozzle 111. The amine group facilitates the reaction with polymer resin in the following process.

The third modification step S203 is to modify the surface of the liquid crystal dropping nozzle 111, which has been subject to the second modification step S202, by allowing an epoxy resin to react with the surface of the liquid crystal dropping nozzle 111.

According to the third modification step S203, the amine group reacts with hydrophobic polymer resin. The hydrophobic polymer resin may be, for example, an epoxy resin having an end coupled with an epoxy group such that the hydrophobic polymer resin reacts with the amine group. For example, the epoxy resin may be epoxy terminated silicone.

The silicone resin may include, for example, an epoxy terminated PDMS (polydimethylsiloxane). The PDMS may have a proper size. For example, the PDMS may have the average molecular weight of about 500 to about 8000.

The silicone may be, for example, epoxy silane. According to one embodiment of the present invention, the epoxy silane may include, for example, 3-(2,3-epoxyproxy)propyltrimethoxysilane, (3-g lycydoxypropyl)triethoxysilane, 5,6-epoxyhexyltriethoxysilane, (3-glycydoxypropyl)methyldiethoxysilane, (3-glycydoxypropyl)methyldimethoxysilane, (3-glycydoxypropyl)dimethoxylethoxysilane, 2-(3,4-epoxycyclohexyl)ethyltriethoxysilane, or 2-(3,4-epoxycyclohexyl)ethyltrimethoxysilane.

The polymer resin may be provided in a liquid phase. The polymer resin may be coated or dropped on the surface of the liquid crystal dropping nozzle 111 which has been subject to the second modification step S202. The liquid crystal dropping nozzle 111, which has been subject to the second modification step S202, is dipped into the polymer resin, so that the polymer resin is placed on the surface of the liquid crystal dropping nozzle 111. In the liquid crystal dropping nozzle 111 having the polymer resin, the amine group and the polymer resin are maintained at the temperature in the range of about 70° C. to about 100° C. for about 4 hours to about 7 hours.

Accordingly, as shown through reference sign N3 of FIG. 6, the polymer resin may react with the amine group, so that the polymer resin may be attached to the surface of the liquid crystal dropping nozzle 111. According to the present embodiment, the polymer resin may include, for example, monoglycidyl ether terminated PDMS.

After the surface of the liquid crystal dropping nozzle 111 has been subject to the third modification step S203, an epoxy resin layer of about 10 nm is formed on the surface of the liquid crystal dropping nozzle 111.

The liquid crystal dropping nozzle 111 of the liquid crystal dispenser 100 according to one embodiment of the present invention is prepared through the first to third modification steps S201, S202, and S203.

The liquid crystal dropping nozzle 111 that has been modified according to one embodiment of the present invention is installed in the liquid crystal dispenser 100. The liquid crystal 31 is separately prepared and provided to the liquid crystal dispenser 100. The liquid crystal dropping nozzle 111 is directed toward the first substrate 10 (or the second substrate 20) on which the liquid crystal 31 is dropped. The liquid crystal 31 is exhausted to the first substrate 10 through the liquid crystal dispenser 100. When the liquid crystal 31 is dropped by using the liquid crystal dispenser 100, an amount of the liquid crystal 31 dropped one time may vary according to the size of a target substrate, the interval (that is, cell gap) between two substrates, a dropped position of the liquid crystal 31, and the distance between liquid crystals 31 to be dropped.

The liquid crystal dropping nozzle 111 of the liquid crystal dispenser 100 according to the embodiment of the present invention, which has been subject to the first to third modification steps S201 to S202, represents very low wettability with respect to the liquid crystal 31. Therefore, the liquid crystal dispenser 100 equipped with the liquid crystal dropping nozzle 111, which has been modified according to the embodiment of the present invention, can drop a more uniform and exact amount of liquid crystal as compared with that of a conventional liquid crystal dispenser. When dropping the liquid crystal 31, a dropped amount of the liquid crystal may be a significant factor for exactly forming the liquid crystal layer 30 at a desirable thickness. As the thickness of the liquid crystal layer 30 may be closely related with the cell gap of a liquid crystal panel, an exactly dropped amount of the liquid crystal 31 may be significant in preventing the liquid crystal panel from being failed. The embodiment of the present invention may allow the liquid crystal dispenser 100 to drop an exact amount of the liquid crystal 31 without the aggregation of the liquid crystal 31, and the experimental result for the behavior of the liquid crystal 31 is as follows.

FIGS. 7A to 7D are cross-sectional views from corresponding photographs showing contact angles of liquid crystal when the first to third modification according to the embodiment of the present invention are sequentially performed with respect to a nozzle including an SUS material, and the liquid crystal is dropped on the surface of the nozzle.

In the following description, an angle between the interface of the liquid crystal and the surface of the nozzle is referred to as a contact angle.

Figure 7A:
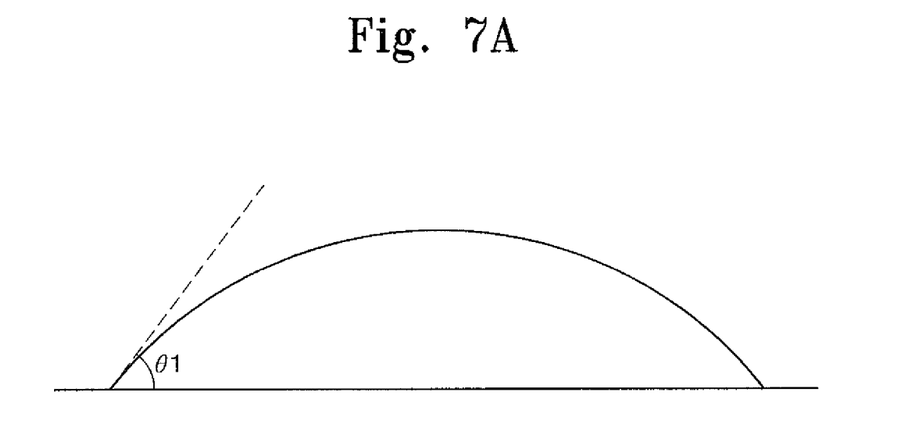
FIGS. 7A and 7D are cross-sectional views from corresponding photographs showing contact angles of liquid crystal when the liquid crystal is dropped on a SUS nozzle having a surface modified according to an exemplary embodiment of the present invention.
Figure 7B:
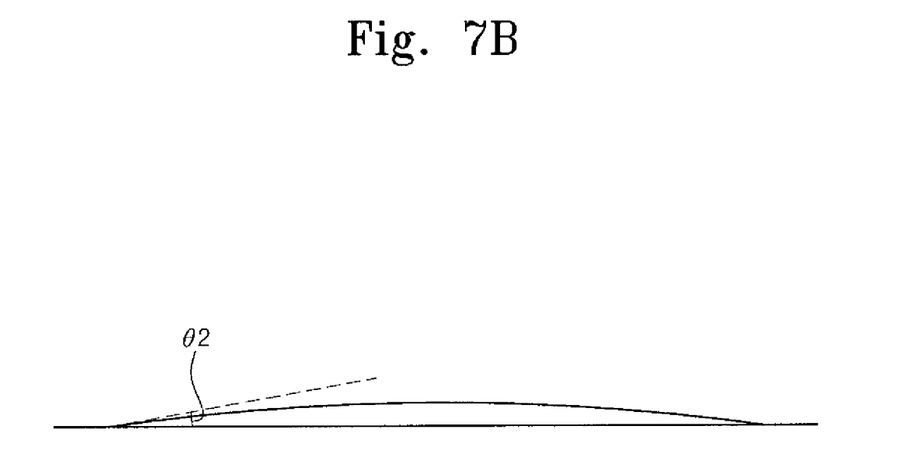
Figure 7C:
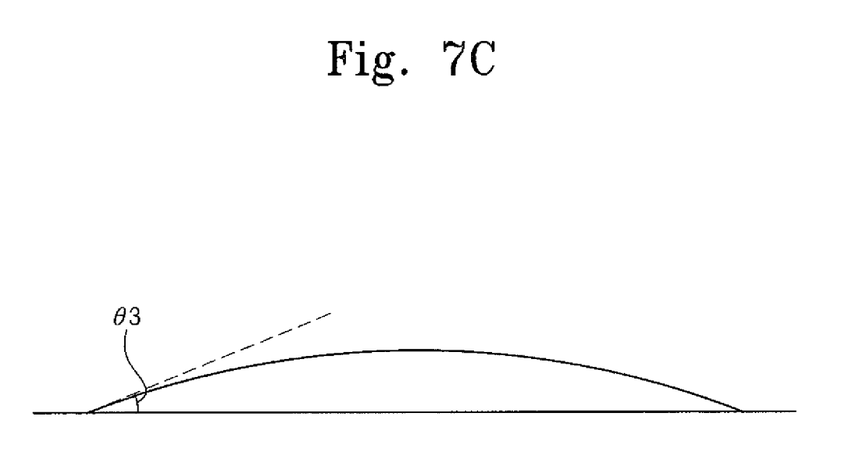
Figure 7D:
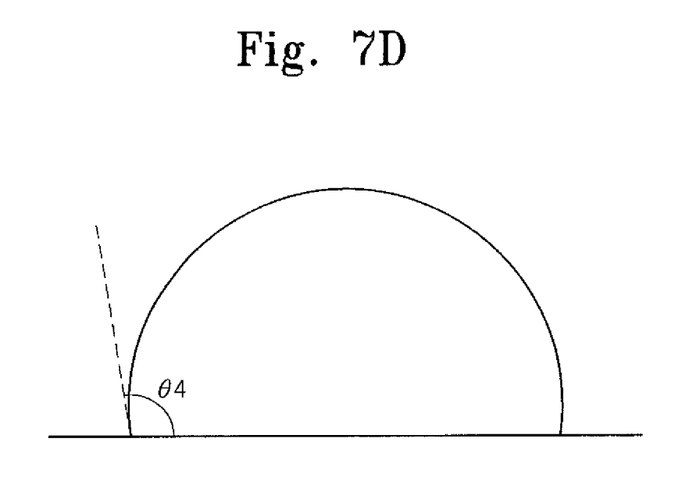

FIG. 7A is a cross-sectional view from a corresponding photograph representing liquid crystal dropped on the surface of the nozzle that is not treated. The surface of the nozzle that is not treated is washed by using acetone several times. FIG. 7B is a cross-sectional view from a corresponding photograph representing liquid crystal dropped on the surface of a nozzle obtained after $O_2/O_3$ plasma treatment has been performed with respect to the surface of the nozzle of FIG. 7A. FIG. 7C is a cross-sectional view from a corresponding photograph representing liquid crystal dropped on the surface of a nozzle obtained after the surface of the nozzle of FIG. 7B has been dipped into APTES such that a hydroxyl (—OH) group on the surface of the nozzle reacts with the APTES. FIG. 7D is a cross-sectional view from a corresponding photograph representing liquid crystal dropped on the surface of a nozzle obtained after the surface of the nozzle of FIG. 7C has been dipped into epoxy terminated PDMS to react with the epoxy terminated PDMS.

As shown in FIGS. 7A to 7D, on the assumption that the contact angles between the liquid crystal and the nozzle are θ1, θ2, θ3, and θ4, the θ1, θ2, θ3, and θ4 are about 52.5°, about 9°, about 21.9°, and about 98.2°, respectively. It is noticeable that a contact angle of about 52.5° is represented in the case of the nozzle that is not treated, but a great contact angle of about 98.2° is represented after the surface of the nozzle has been modified three times according to the embodiment of the present invention.

It is observed that the wettability of the liquid crystal is lowered with respect to the surface of the nozzle as the contact angle is increased. Accordingly, the liquid crystal may be readily separated from the surface of the nozzle. According to embodiments of the present invention, the liquid crystal represents low wettability with respect to the modified nozzle surface, so that the aggregation phenomenon of the liquid crystal on the modified nozzle surface may be significantly lowered.

FIGS. 8A to 8D are cross-sectional views from corresponding photographs showing contact angles of liquid crystal when the first to third modification according to the embodiment of the present invention are sequentially performed with respect to a nozzle including a tungsten carbide, and the liquid crystal is dropped on the surface of the nozzle.

Figure 8A:
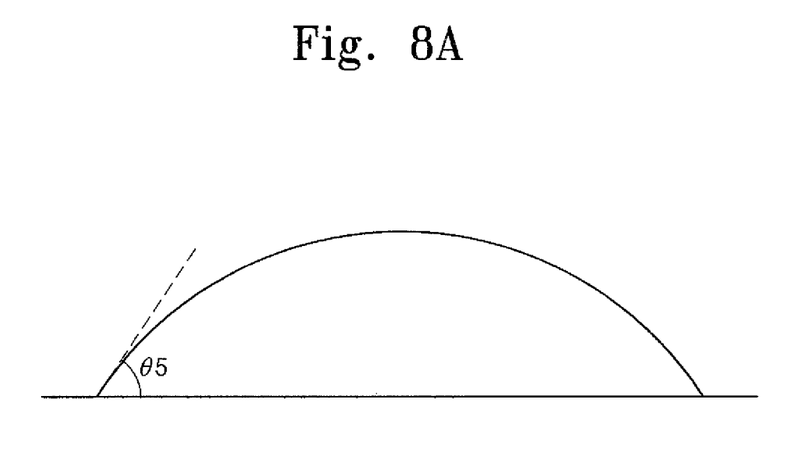
FIGS. 8A and 8D are cross-sectional views from corresponding photographs showing contact angles of liquid crystal when the liquid crystal is dropped on a tungsten-carbide nozzle having a surface modified according to an exemplary embodiment of the present invention.
Figure 8B:
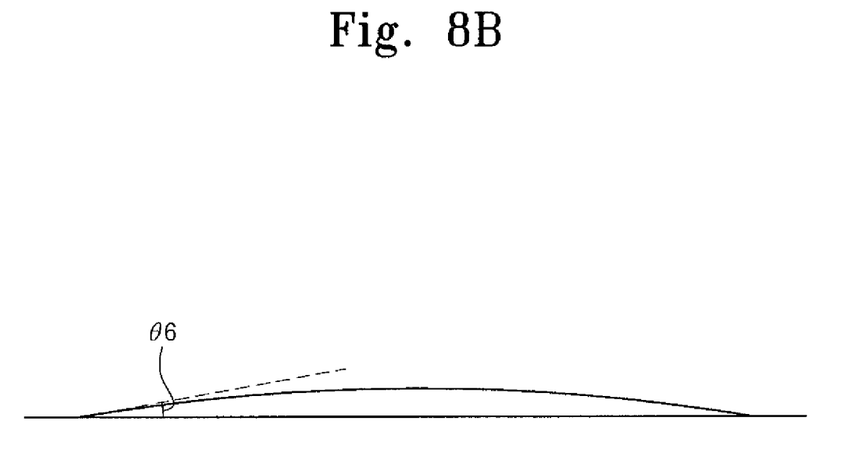
Figure 8C:
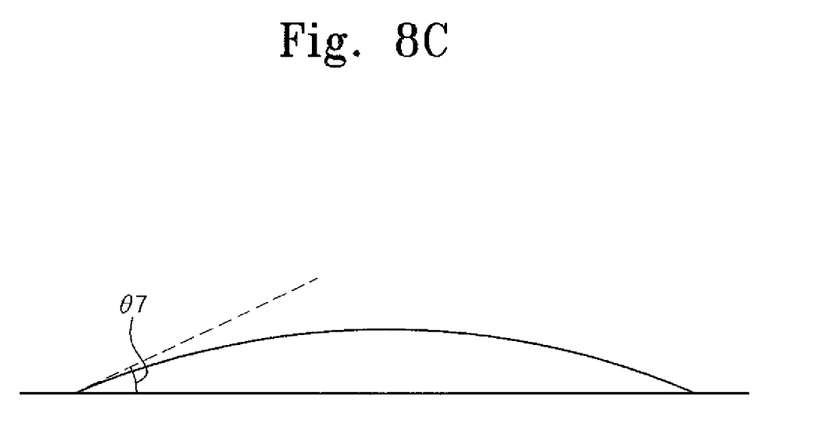
Figure 8D:
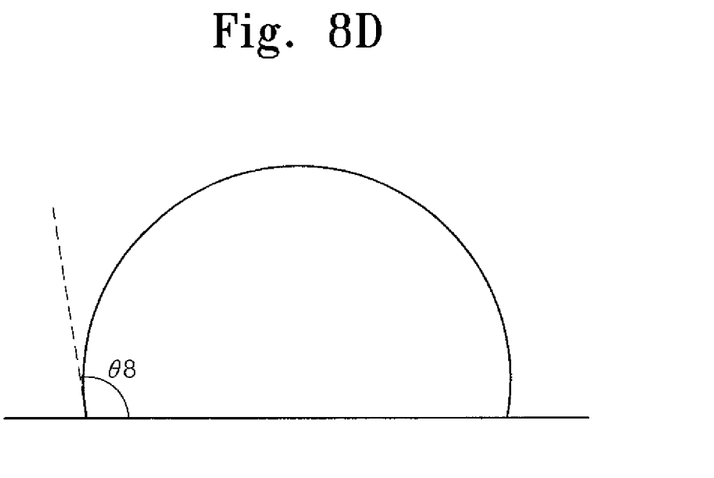

FIG. 8A is a cross-sectional view from a corresponding photograph representing liquid crystal dropped on the surface of the nozzle that is not treated. The surface of the nozzle that is not treated is washed by using acetone several times. FIG. 8B is a cross-sectional view from a corresponding photograph representing liquid crystal dropped on the surface of a nozzle obtained after $O_2/O_3$ plasma treatment has been performed with respect to the surface of the nozzle of FIG. 8A. FIG. 8C is a cross-sectional view from a corresponding photograph representing liquid crystal dropped on the surface of a nozzle obtained after the surface of the nozzle of FIG. 8B has been dipped into APTES to react with the APTES. FIG. 8D is a cross-sectional view from a corresponding photograph representing liquid crystal dropped on the surface of a nozzle obtained after the surface of the nozzle of FIG. 8C has been dipped into epoxy terminated PDMS to react with the epoxy terminated PDMS.

As shown in FIGS. 8A to 8D, on the assumption that the contact angles between the liquid crystal and the nozzle are θ5, θ6, θ7, and θ8, the θ5, θ6, θ7, and θ8 are about 57.2°, about 10°, about 22.6°, and about 100.7°, respectively. It is noticeable that a contact angle of about 57.2° is represented in the case of the nozzle that is not treated, but a great contact angle of about 100.7° is represented after the surface of the nozzle has been modified three times according to the embodiment of the present invention. Therefore, according to embodiments of the present invention, the liquid crystal represents low wettability with respect to the nozzle surface even when the nozzle surface includes tungsten carbide, other than the SUS material, so that the aggregation of the liquid crystal on the modified nozzle surface may be significantly lowered.

Table 1 shows an exhaust test result when the liquid crystal dispenser 100 equipped with the nozzle modified according to the embodiment of the present invention exhausts liquid crystal. The following liquid crystal exhaust test has been performed to represent the average amount of exhausted liquid crystal and the exhaust state of the liquid crystal under the conditions that about 2.0 mg of liquid crystal is exhausted by using a nozzle having an bore of about 150 μm to about 300 μm. In the following first to fifth liquid crystal exhaust tests, the liquid crystal is exhausted 100 times per each test under the same conditions except for the surface modification of the nozzle.

In Table 1, a first nozzle, referred to as a Nozzle 1 in the table 1, is coated with Teflon (polytetrafluoroethylene), and a second nozzle, referred to as a Nozzle 2 in the table 1, is obtained by coating a nozzle, which is not subject to treatment, with PDMS. A third nozzle, referred to as a Nozzle 3 in the table 1, has a surface modified according to the present invention. The exhaust test result is classified as "PASS" and "Failure" by estimating whether or not the average amount of dropped liquid crystal approximates about 2 mg, and whether or not the liquid crystal is continuously exhausted.

TABLE 1

| Nozzle | Bore | 1st | 2nd | 3rd | 4th | 5th | Result |
|---|---|---|---|---|---|---|---|
| Nozzle 1 | 150 μm | 1.5 mg | 1.5 mg | 1.8 mg | 1.6 mg | 1.57 mg | Failure |
| Nozzle 2 | 150 μm | Not exhausted | Not exhausted | — | — | — | Failure |
| Nozzle 3 | 150 μm | 2.0 mg | 2.0 mg | 2.0 mg | 2.0 mg | 2.0 mg | Pass |
|  | 300 μm | 2.02 mg | 2.01 mg | 2.01 mg | 1.99 mg | 2.007 mg | Pass |

Referring to Table 1, when liquid crystal is exhausted by using the nozzle coated with Teflon, although an amount of exhausted liquid crystal is preset to about 2.0 mg, an actual amount of exhausted liquid crystal does not reach about 2.0 mg. In addition, an amount of exhausted liquid crystal may vary according to the number of times being exhausted. That is, the aggregation of the liquid crystal occurring on the nozzle surface may exert an influence on an amount of exhausted liquid crystal. Therefore, as the first nozzle does not exhaust an exact amount of liquid crystal and exhaust an irregular amount of the liquid crystal, the first nozzle is determined as "Failure".

When liquid crystal is exhausted by using a nozzle, in which PDMS is coated on a non-treatment surface, the liquid crystal may not be exhausted at all because the liquid crystal represents great wettability with respect to the nozzle. Accordingly, the second nozzle does not exhaust liquid crystal, so that the second nozzle is determined as "Failure".

When liquid crystal is exhausted by using a nozzle modified according to the embodiment of the present invention, an average amount of exhausted liquid crystal is represented as about 2.0 mg regardless of the bore of the nozzle. In addition, although the exhaust tests have been performed five times, the variation in an amount of the exhaust liquid crystal is rarely represented. Accordingly, the nozzle is determined as "PASS".

Table 2 represents a test result obtained when a liquid crystal dispenser equipped with a nozzle corresponding to the third nozzle is washed by using acetone for one week after the experiment of table 1 has been performed by using the liquid crystal dispenser, and liquid crystal is exhausted three times by using the liquid crystal dispenser for the purpose of estimating the surface stability of the nozzle modified according to the embodiment of the present invention. In table 2, liquid crystal is exhausted 100 times per each test.

TABLE 2

| Nozzle | Bore | 1st | $2^{nd}$ | 3rd | Result |
|---|---|---|---|---|---|
| Nozzle 3 | 150 μm | 2.0 mg | 2.0 mg | 2.0 mg | Pass |
|  | 300 μm | 2.008 mg | 2.007 mg | 2.007 mg | Pass |

Referring to Table 2, in the three-time exhaust test after the liquid crystal dispenser has been washed by using acetone for one week, an average amount of exhausted liquid crystal extremely approximates about 2 mg, which has been preset, without the variation in an amount of exhausted liquid crystal. Therefore, the nozzle modified according to the embodiment of the present invention represents high surface stability.

As described above, the embodiments of the present invention may provide a liquid crystal dispenser to drop an exact amount of liquid crystal without the aggregation of the liquid crystal. Hereinafter, the description thereof will be made in more detail.

In general, when a liquid crystal layer is formed by dropping liquid crystal, the liquid crystal is dropped by using a nozzle. When the liquid crystal is dropped from the nozzle, the liquid crystal may be aggregated due to the surface tension of the liquid crystal. Especially, as liquid crystal having high viscosity may have great adhesive property with respect to metal mainly constituting the nozzle, the liquid crystal may be readily aggregated in the nozzle. Accordingly, after liquid crystal has been exhausted, liquid crystal may remain in an outlet of the nozzle. As time elapses, the remaining liquid crystal may become hardened. The hardened liquid crystal may in turn form undesirable materials on an exhaust surface of the nozzle, so that subsequent liquid crystal may be exhausted without making a complete form of a droplet. Therefore, an exact amount of liquid crystal may not be supplied. If liquid crystal is excessively aggregated, a nozzle may be clogged. Such a phenomenon frequently occurs in the liquid crystal dispenser and the defective rate caused by the liquid crystal dispenser may be about 54% based on the total defective rate.

This type of defect may cause the secondary defect of stopping the operation of the liquid crystal dispenser because a sensor, which detects the exhaust state of the liquid crystal, may detect the non-exhaust state of the liquid crystal. In addition to the loss caused by the stop of the liquid crystal dispenser, a great amount of time may be required to remove liquid crystal aggregated on a nozzle when the defect occurs, or replace the defective nozzle with new one and test the liquid crystal dispenser before re-operating the liquid crystal dispenser. In addition, when washing or replacing the nozzle, a reaction chamber for the reaction of a substrate must be open. In this case, foreign matters may be introduced into the reaction chamber. For the reasons, additional failures may occur in the liquid crystal dispenser.

According to the embodiments of the present invention, to reduce the adhesive property for the nozzle of the liquid crystal dispenser, the nozzle may be subject to surface-treatment, thereby preventing liquid crystal from being aggregated. In particular, the surface of the nozzle may be modified such that the nozzle has a hydrophobic property, thereby preventing the liquid crystal from sticking to the surface of the nozzle.

In addition, according to the embodiments of the present invention, the nozzle can adjust a polymer resin film to a uniform thickness as a hydrophobic polymer resin may stick to the nozzle through chemical reaction.

According to the present invention, the fine part of the edge of the nozzle can be coated. Conventionally, fluorocarbon resin (e.g., Teflon) used to coat a nozzle is not fabricated at a uniform thickness, and is not coated onto the fine part of the edge of the nozzle. The embodiments of the present invention can solve this difficulty. In addition, different form the conventional art in which a portion of the fluorocarbon resin film is separated and acts as foreign matter on a substrate, the polymer resin according to the embodiment of the present invention is neither separated nor does it act as foreign matter on a substrate.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of modifying a surface of a nozzle of a liquid dispenser used to dispense liquid for manufacturing a liquid crystal display (LCD), the method comprising:
   primarily modifying the surface of the nozzle by performing one of oxygen ($O_2$) or ozone ($O_3$) plasma treatment with respect to the surface of the nozzle;
   secondarily modifying the primarily modified surface of the nozzle by treating the primarily modified surface with aminopropyltriethoxysilane; and
   tertiary modifying the secondarily modified surface of the nozzle by allowing an epoxy resin to react with the secondarily modified surface of the nozzle.

2. The method of claim 1, wherein the tertiary modified surface of the nozzle comprises an epoxy resin layer having a thickness of about 10 nm.

3. The method of claim 1, wherein the tertiary modifying of the secondarily modified surface of the nozzle comprises dropping the epoxy resin on the secondarily modified surface of the nozzle.

4. The method of claim 1, wherein the tertiary modifying of the secondarily modified surface of the nozzle comprises dipping the secondarily modified surface of the nozzle into the epoxy resin.

5. The method of claim 1, wherein the epoxy resin comprises epoxy terminated silicone.

6. The method of claim 5, wherein the epoxy terminated silicone comprises epoxy terminated polydimethylsiloxane.

7. The method of claim 6, wherein the polydimethylsiloxane has an average molecular weight of about 500 to about 8000.

8. The method of claim 5, wherein the epoxy terminated silicone comprises epoxy silane.

9. The method of claim 8, wherein the epoxy silane comprises one selected from the group consisting of 3-(2,3-epoxyproxy)propyltrimethoxysilane, (3-glycydoxypropyl)triethoxysilane, 5,6-epoxyhexyltriethoxysilane, (3-glycydoxypropyl)methyldiethoxysilane, (3-glycydoxypropyl)methyldimethoxysilane, (3-grycydoxypropyl)dimethoxylethoxysilane, 2-(3,4-epoxycyclohexyl)ethyltriethoxysilane, and 2-(3,4-epoxycyclohexyl)ethyltrimethoxysilane.

10. The method of claim 5, wherein the nozzle comprises one of SUS (steel use stainless), tungsten compounds, or aluminum.

11. The method of claim 10, wherein the nozzle has a bore in a range of about 150 μm to about 300 μm.

12. The method of claim 10, wherein the liquid comprises at least one of liquid crystal, a sealant, or alignment solution used for manufacturing a liquid crystal display.

13. The method of claim 1, wherein in the tertiary modifying step, the epoxy resin and an amine group formed on a surface of the nozzle from the secondarily modifying step react with one another, and the nozzle is maintained at temperature at about 70° to about 100° for about 4 hours to about 7 hours during the tertiary modifying step.

14. The method of claim 1, wherein the plasma treatment injecting one of the $O_2$ or the $O_3$ is performed in a reaction chamber for about 30 seconds to about one minute by using a plasma injector while maintaining an internal pressure of the reaction chamber under about 50 mTorr to about 100 mTorr.

15. A method of forming a liquid crystal layer, the method comprising:
   preparing a nozzle to drop liquid;
   modifying a surface of the nozzle through the method according to claim 1;
   mounting the nozzle having the modified surface on a liquid dispenser;
   preparing liquid crystal;
   preparing a substrate for a liquid crystal display; and
   exhausting the liquid crystal on the substrate through the nozzle with the modified surface mounted on the liquid dispenser.

16. A method for manufacturing a Liquid Crystal Display (LCD), the method comprising:
   modifying a surface of a nozzle of a liquid dispenser, the method including:
   primarily modifying the surface of the nozzle by performing one of oxygen ($O_2$) or ozone ($O_3$) plasma treatment with respect to the surface of the nozzle,
   secondarily modifying the primarily modified surface of the nozzle by treating the primarily modified surface with aminopropyltriethoxysilane, and
   tertiary modifying the secondarily modified surface of the nozzle by allowing an epoxy resin to react with the secondarily modified surface of the nozzle;
   installing the nozzle with the surface modified by the primarily, secondarily and tertiary modifying steps on a liquid dispenser to dispense a liquid comprising at least one of liquid crystal, a sealant and alignment solution;
   forming gate lines, data lines, thin film transistors and pixel electrodes on a first substrate, wherein each thin film transistors is connected to a corresponding one of the gate lines and data lines and the pixel electrodes are connected to the thin film transistors;
   forming a first alignment layer on the first substrate having the thin film transistors thereon and rubbing the first alignment layer;
   dispensing liquid crystal on the first alignment layer;
   forming color filters and a common electrode on a second substrate;
   forming a second alignment layer on the second substrate having the color filters and the common electrode thereon and rubbing the second alignment layer;
   applying a sealant to an outer portion of at least one of the first and second substrates;
   combining the first and second substrates to each other by applying a pressure to the first and second substrates, thereby forming a liquid crystal layer between the combined first and second substrates;
   processing the combined first and second substrates by cutting the combined first and second substrates; and
   checking to determine whether there are any defects in the processed first and second substrates.

17. The method of claim 16, wherein the dispensing of the liquid crystal on the first alignment layer is performed using the liquid dispenser having the nozzle with the surface modified by the primarily, secondarily and tertiary modifying steps.

18. The method of claim 16, wherein the forming of at least one of the first and the second alignment layers is performed by dispensing the alignment solution using the liquid dispenser having the nozzle with the surface modified by the primarily, secondarily and tertiary modifying steps.

19. The method of claim 16, wherein the applying of the sealant is performed by dispensing the sealant using the liquid dispenser having the nozzle with the surface modified by the primarily, secondarily and tertiary modifying steps.

* * * * *